United States Patent [19]

Volin

[11] 4,134,852

[45] Jan. 16, 1979

[54] PROCESS FOR PREPARING MIXED METAL OXIDE CATALYSTS

[75] Inventor: Timothy E. Volin, Tuxedo, N.Y.

[73] Assignee: The International Nickel Company, Inc., New York, N.Y.

[21] Appl. No.: 830,050

[22] Filed: Sep. 2, 1977

[51] Int. Cl.$^2$ .................. B01J 23/10; B01J 23/58; B01J 23/64; B01J 23/78

[52] U.S. Cl. ................... 252/472; 252/462; 252/467; 252/468; 252/471; 252/473; 252/474; 252/475; 252/476; 423/213.5

[58] Field of Search ............... 252/462, 467, 472, 473, 252/474, 475, 468, 471, 476; 423/593; 241/27

[56] References Cited

U.S. PATENT DOCUMENTS 3,897,367  7/1975  Lauder ................... 252/462
3,905,918  9/1975  Mai et al. ................ 252/462

FOREIGN PATENT DOCUMENTS 1429085  3/1976  United Kingdom.

Primary Examiner—W. J. Shine
Attorney, Agent, or Firm—Ewan C. MacQueen; Miriam W. Leff

[57] ABSTRACT

Mixed metal oxides are prepared as catalyst materials by a method comprising high energy impact milling of a formulated mixture of powders to form a mechanically alloyed product and heat treating said product in an oxidizing atmosphere to form the desired compound. In a preferred embodiment a catalytic material is formed which has the general empirical formula $ABO_3$ and a perovskite-type crystal structure.

23 Claims, 2 Drawing Figures

PROCESS FOR PREPARING MIXED METAL OXIDE CATALYSTS

This invention relates to a process for the production of catalysts having a mixed metal oxide structure, and particularly to the production of stable mixed metal oxide catalysts containing one or more platinum group metals.

There is a present awareness of the potential of mixed metal oxides as catalysts in many fields. One of the most important factors in a catalyst material for a particular process - especially one involving a complex reaction system - is the composition of the catalyst since small variations in composition can have a large impact on the success or failure of the material for the desired result. Variations in crystal structure can also play a role in the catalytic activity of a material. The vast possibilities that mixed metal oxides offer in tailoring compositional and structural variations for a specific requirement make them very attractive for catalytic adaptations.

Mixed metal oxides are well known. They are described, for example, in the following publications which are incorporated herein by reference; the chapter "Mixed Metal Oxides" in "Progress in Inorganic Chemistry", Vol. I, Ed. F. A. Cotton, pp. 465-536, Interscience (1959), the section on "Non-stoichiometric and mixed metal oxides" in "Inorganic Chemistry", Vol. I by C. S. G. Phillips and R. J. P. Williams, pp. 485-491, Oxford University Press (1965).

In general, as shown in the literature mixed metal oxides are crystalline compounds, and they are classified by general formulas and certain structural types characteristic of naturally occurring minerals. Among the crystalline oxides described are: the perovskite type having the general formula $ABO_3$, the spinel type having the formula $AB_2O_4$, the pyrochlore type having the general formula $A_2B_2O_7$, the ilmenite type having the general formula $B_2O_3$, the rutile type having the general formula $ABO_4$, the rock salt type having the general formula $AO$. In the formulas A and B stand for cations. More than one cation for each A and B may be present. It is at once apparent that there are quite a large number of compounds which fall within the scope of the term mixed metal oxides. The compounds and their structure can be identified by X-Ray diffraction.

As indicated above, catalytic activity of mixed metal oxides is presently under investigation for many different types of reactions and for many different compounds. The following are examples of U.S. patents that show the use of mixed metal oxides as catalysts: U.S. Pat. No. 3,644,147, No. 3,780,126, No. 3,865,923, No. 3,897,367, No. 3,900,428, No. 3,901,828, No. 3,905,918, No. 3,929,670, No. 3,947,380, No. 3,972,837, No. 3,974,255, No. 3,976,599 and No. 4,010,091. The patents show that the mixed metal oxides used include those having, e.g., perovskite, spinel, pyrochlore, and ilmenite structures. The fields in which such materials have been used include electrocatalysis, hydrogenation, dehydrogenation, and auto exhaust purification.

The present invention relates to a novel method of preparing mixed metal oxide catalysts. More particularly it relates to a method of preparing catalytic materials having a perovskite or spinel type crystal structure. The description below is given mainly with reference to perovskite structured mixed metal oxides containing at least one platinum-group metal, which are used for the purification of automotive exhaust streams. Such materials have been shown to be effective, for example, for the simultaneous removal of harmful constituents of exhaust streams containing oxides of nitrogen, carbon monoxide and hydrocarbons. Perovskite structure and chemistry and the use of specific compositions as automotive exhaust catalysts have been discussed in detail in the literature. U.S. Pat. No. 3,897,367, No. 3,900,428, No. 3,901,828, No. 3,905,918, No. 3,972,837 and No. 3,865,923 are examples of patents which pertain particularly to perovskite oxide catalyst compositions. Papers by R. J. H. Voorhoeve et al in Science, Vol. 180, pp. 62-64 (1973), by M. W. Chien et al in Ind. Eng. Chem (Prod. Res. Div.), Vol. 14, pp. 131-134 (1975), by R. J. H. Voorhoeve et al in Mat. Res. Bull., Vol. 9, pp. 1393-1404 (1974), S. C. Wu et al in Ind. Eng. Chem. (Prod. RES. DEV.), Vol. 16, pp. 136-137 (1977) and by R. J. H. Voorhoeve et al in Science, Vol. 195, pp. 827-833 (1977), are examples of articles which pertain to the use of perovskite-structured oxide catalysts.

Among the techniques for preparing perovskitestructured oxides as catalysts are those which involve forming the catalysts from pre-formed compounds. The compounds can be used in unsupported form, e.g., as a powder, pellets or spheres or they can be deposited on a substrate of any desired shape, e.g., pellets, screens, honeycombs of a suitable material, e.g., a ceramic such as zircon mullite, mullite, alpha-alumina, cordierite, zircon, magnesium silicate, and many alumino-silicates, or a metal, such as various INCONEL nickel-chromium alloys. (INCONEL is a trademark of INCO LIMITED and affiliated companies.) The substrate may carry the catalytic oxides as a deposit on, e.g., an activated carrier and/or a material which will enhance the adherence of the catalyst coating. Much art is available on the production of suitable supported and unsupported catalyst structures. It includes the preparation of slurries and slips containing, in addition to the preformed catalytic compound, various materials which can be developed into activated carriers, e.g., oxides and/or hydroxides of Al, Mg, Si, Zr, rare earth metals and combinations thereof. For efficient use of catalysts, it is well known to deposit catalytic materials on substrates so as to have a high surface to volume ratio of the catalytic material. It has been found that in addition to savings in cost of materials, the deposit of a catalyst on a carrier may lessen the tendency of the catalyst to be poisoned, and/or prolong catalyst life. To those skilled in the art, the techniques for applying catalyst materials to supports are well known.

The present invention is particularly concerned with a method for synthesizing the mixed metal oxides (such as the perovskite-structured oxides), per se. Once the compounds are prepared any of the well-known techniques can be used for producing the supported or unsupported structures. The techniques which may be used for preparing supported catalysts from pre-formed compounds are distinguishable at the outset from those in which a support material is impregnated with a solution containing dissolved therein a suitable mixture of salts of perovskite-forming elements and the impregnated supports are fired to form the compounds in-situ. A disadvantage of any technique which relies on depositing the catalyst on a substrate from solution is that there are limitations imposed by solubility of the salts of the components and by mutual solubility of salts of components to be co-deposited. This makes the synthesis less flexible in terms of the initial components and final products. Also, low solubilities will result in a low loading potential on the substrate which would make it necessary to repeat the depositing steps several times in order to build up the required catalyst concentration on the substrate. It is believed that despite such problems, the impregnation technique has been used in order to obtain a catalyst material of small particle size, and therefore increased surface area and to produce a material of proper structure by a relatively simple route. Heretofore, methods which involve the initial formation of the desired crystal structure — i.e. before it is deposited on a substrate — have not been entirely satisfactory. The aforementioned article by Voorhoeve et al in Science Vol. 195 (March 1977) gives an outline of the advantages and disadvantages of various methods used to synthesize perovskites. In general, methods which involve solution techniques have the limitations of requiring mutually soluble compounds. Other special problems are, for example, for co-precipitation — common precipitating reagents are required — and for freeze-drying and spray-drying methods — highly specialized expensive equipment is necessary. In addition, there are the limitations imposed by solubility of the salts of the components. The present method, in contrast to the solution techniques, involves the mixing of various combinations of constituent elements, oxides or compounds which in processing will convert to the desired mixed metal oxide. In theory this type of technique is very simple, but proposed methods have not been satisfactory in terms of the time and temperature requirements, and they have not produced consistently, material of the desired quality in terms of homogeneity and/or surface area. For example, one of the leading ways perovskite-structured oxides have been prepared as the pre-formed compounds is by extended grinding of mixtures of perovskite-forming metals, their oxides, hydroxides and/or salts, followed by heating and further grinding steps. The grinding and milling is carried out using conventional techniques. While catalyst preparation by grinding perovskite-forming compounds does not have the disadvantage imposed by solution techniques, it is difficult to achieve chemical homogeneity with materials, and it has been found that preparations of perovskite-structured oxides using conventional grinding require extended and repetitive grinding and heat treatment procedures to form suitable materials. In one described method, for example, a mixture of rare earth oxide, alkaline earth oxide, alkaline earth carbonate, cobalt carbonate, and platinum metal oxide was ground in air until homogeneous, heated at 950°–1000° C. for four days, during which time the mixture was occasionally reground and remixed.

It has now been found that mechanically alloyed powders having the metallic constituents provided in the proper proportions will when subjected to appropriate conditions react to form perovskite-structured oxides. Further, this product will be homogeneous and of a form uniquely suited to catalytic applications, i.e., a fine, high surface area powder of a mixed metal oxide having essentially a single phase mixed metal oxide structure. In accordance with the present method compositions having a suitable perovskite structure can be made in a relatively short period of time and without limitations in composition or loading imposed by deposit from an aqueous solution. In a preferred embodiment, powders of relatively high surface area are produced.

THE INVENTION

The present invention involves an improved process for producing a mixed metal oxide catalytic material comprising subjecting a mixture of powders formulated to contain, or on heat treatment in an oxidizing atmosphere to contain, a stoichiometric ratio of the constituents of the desired oxide to high energy impact milling to produce a mechanically-alloyed powder and heating the mechanically alloyed powder in an oxidizing atmosphere to effect conversion to an essentially single phase mixed metal oxide structure.

Exemplary of the mixed metal oxides formed (and their general empirical formulas) are oxides of:
the perovskite type having the formula $ABO_3$,
the spinel type having the formula $AB_2O_4$,
the pyrochlore type having the formula $A_2B_2O_7$,
the ilmenite type having the formula $B_2O_3$,
the rutile type having the formula $ABO_4$,
and the rock salt type having the formula AO.

In accordance with one aspect of the present invention an improved process is provided for producing a compound having the general empirical formula $ABO_3$ and a perovskite crystal structure, as shown by X-ray diffraction, and having a predetermined composition, which comprises:

(a) subjecting a mixture of powders, formulated to contain the components represented by A and B in the formula in such proportions as to react to form the predetermined composition, to dry high energy impact milling to produce a mechanically alloyed powder, and (b) heating said mechanically alloyed powder in an oxidizing atmosphere to effect conversion to an essentially single phase perovskite structure.

With respect to the conditions for developing the perovskite structure, it is noted that the objective is to achieve the desired compounds using the lowest temperature at which this can be accomplished in a reasonable period of time. In general, to achieve conversion to a perovskite structure, for example, in one hour, a final temperature greater than 800° C., and preferably between about 900° C. and 1200° C. should be used.

In accordance with a preferred embodiment a high surface area product is obtained by a two-stage heat treatment, both in an oxidizing atmosphere, comprising subjecting the mechanically-alloyed powder to a temperature below about 800° C., suitably between about 300° C. and 700° C., e.g. about 600° C. for a period of up to about 5 hours, suitably about ¼ to 4 hours, e.g. about 1 hour, and then elevating the temperature to above about 900° C., suitably between about 900° C. and 1200° C., e.g. 1000° C. for a period of 1 to 100 minutes, e.g. about 10 minutes. In order to obtain an optimum conversion to the desired mixed oxide structure in the second stage heating, the powder is maintained at a bed depth of less than about 1 inch, suitably about ¼ inch to about ¾ inch, e.g. about ½ inch.

The oxidizing atmosphere may be, for example, a free-oxygen-containing gas such as air or $O_2$.

The mixed metal oxide catalysts in accordance with this invention may in turn be used in combination with other catalytically active species. For instance, platinum may be deposited on a perovskite catalyst composition of this invention by various techniques known to the artisan, e.g. soaking in solutions of platinum salts and calcining.

DETAILED DESCRIPTION OF A PREFERRED EMBODIMENT OF THE INVENTION

1. Perovskite-type Structure and Composition

Perovskite-type structures have been described in great detail in the literature, for example, the patents, articles and reference books referred to above. In general, the idealized perovskite structure is one in which a large cation occupies the corner sites of a face centered cubic lattice, the anions occupy the face centered sites, and a small cation occupies the octahedral interstices formed by the anions. The oxide form of this structure has the general empirical formula $ABO_3$, where A is an element or combination of elements such as alkali, alkaline earth or rare earth metals, e.g., K, Ca, Sr, Y, Ba, La or other large ions of metals such as Pb or Bi, having a relatively large ionic radius, and B is an element or combination of elements selected from Groups IB, IVB, VB, VIB, VIIB, & VIII of the Periodic Table such as Ti, Cr, Mn, Co, Ni, Cu, Pt, Pd, Ru, Rh, Os, Ir, Fe, having relatively small ionic radius. Since such a large number of elements within certain ionic size ranges can be substituted into the A or B sites, a great variety of compositional possibilities exist in the perovskite-structured oxide system. Compositional substitutions result in variations in lattice parameters and in some cases a distorted crystalline structure. As indicated above, with respect to mixed metal oxides, generally the only other constraint to satisfy for the perovskite structure is that stoichiometry be maintained. Perovskites are presently viewed as having great versatility. Their diverse properties arise out of the large variations in A and B ions which fit the structure, from the variation in valence state of the transition metal ions, and from the further possibilities of solid solutions of various combinations.

Platinum-group metals are known to have wide utility as catalysts. The perovskite-structured materials have catalytic activity and the structure appears to exhibit a stabilizing effect. For example, oxides of ruthenium tend to volatilize in certain environments in which the ruthenium would be an otherwise desirable catalyst. The stability of the ruthenium in an oxidizing atmosphere can be improved by use as a perovskite-structured compound. The platinum-group metal containing perovskites have been shown to be useful for the treatment of internal combustion (IC) exhaust streams. The use of the perovskitestructured oxides is illustrated herein by their use as catalysts for the conversion of noxious constituents of automobile exhaust streams into harmless compounds, e.g., the reduction of oxides of nitrogen to nitrogen and the oxidation of CO and hydrocarbons to $CO_2$ and $H_2O$. Recently there has been interest particularly in the use of ruthenium for the treatment of automobile exhaust streams as a threeway catalyst, i.e. a catalyst which is active for simultaneously oxidizing CO and hydrocarbons and reducing the nitrogen oxides.

Illustrative examples of perovskite compositions which can be made in accordance with the present invention are given in TABLE I.

TABLE I

| Ru in B site | Pd in B site |
|---|---|
| +* $(Sr_{.2}La_{.8})(Co_{.8}Ru_{.2})O_3$ | +* $(Sr_{.2}La_{.8})(Co_{.8}Pd_{.2})O_3$ |
| +* $(Sr_{.2}La_{.8})(Co_{.9}Ru_{.1})O_3$ | + $(Sr_{.2}La_{.8})(Co_{.9}Pd_{.1})O_3$ |
| + $(Sr_{.2}La_{.8})(Co_{.99}Ru_{.01})O_3$ | + $(Sr_{1.0})(Ti_{.9}Pd_{.1})O_3$ |
| +* $(Sr_{.2}La_{.8})(Co_{.9}Ru_{.1})O_3$ | |
| + $(Sr_{.2}La_{.8})(Mn_{.9}Ru_{.1})O_3$ | |
| + $(Sr_{.2}La_{.8})(Cr_{.8}Ru_{.1})O_3$ | Rh in B site |
| + $(Sr_{.2}La_{.8})(Co_{.88}Ni_{.02}Ru_{.1})O_3$ | + $(Sr_{.2}La_{.8})(Co_{.9}Rh_{.1})O_3$ |
| + $(Sr_{.2}La_{.8})(Co_{.88}Cu_{.02}Ru_{.1})O_3$ | |
| + $(Sr_{.2}La_{.8})(Mn_{.5}Ni_{.4}Ru_{.1})O_3$ | |
| $(Sr_{1.0})(Ti_{.9}Ru_{.1})O_3$ | |
| $(Sr_{.4}La_{.6})(Co_{.9}Ru_{.1})O_3$ | Pt in B site |
| | $(Sr_{.2}La_{.8})(Co_{.9}Pt_{.1})O_3$ |
| Combinations of Pt-Group Metals in B site | |
| + $(Sr_{.2}La_{.8})(Co_{.8}Ru_{.1}Pd_{.1})O_3$ | |
| $(Sr_{.4}La_{.6})(Co_{.8}Pt_{.1}Ru_{.1})O_3$ | |
| $(Sr_{.2}La_{.8})(Co_{.8}Rh_{.1}Ru_{.1})O_3$ | |
| Co-only in B site | |
| + $(La_{1.0})(Co_{1.0})O_3$ | |
| + $(Sr_{.2}La_{.8})(Co_{1.0})O_3$ | |
| + $(Sr_{.3}La_{.7})(Co_{1.0})O_3$ | |
| + $(Sr_{.4}La_{.6})(Co_{1.0})O_3$ | |
| + $(Sr_{.5}La_{.5})(Co_{1.0})O_3$ | |

+Prepared as indicated in Example I
*Tested in a simulated exhaust gas

The above compositions can be made as essentially single phase structures in accordance with the high energy milling technique of the present invention. Crystal structure can be determined by X-ray diffraction. Compositional studies were done mainly on Ru-containing compositions because of the interest in ruthenium as a catalyst for the purification of the automotive exhaust streams. Any of the other precious metals could be substituted in the listed compositions, in principle. All compositions tested in a simulated exhaust gas had interesting catalytic properties. Further illustrations of perovskite compositions useful as catalytic materials, particularly in the treatment of exhaust streams from internal combustion engines can be found in the aforementioned U.S. Patents.

A principal feature of the present invention resides in the preparation of perovskite structured compounds, and a key feature of the present method of preparation is to form a mechanically alloyed powder of a chosen composition. The chosen composition is one which contains or will during the processing steps convert to a predetermined $ABO_3$ composition, and the material prepared is essentially a single phase structure.

It is an important aspect of the present invention that the catalytic mixed metal oxide is prepared as an essentially single phase crystal structure with at most a minor amount of a second phase. The second phase concentration is estimated at less than about 5%, e.g. of the order of about 2%, and samples can be prepared with only a trace amount of another phase. The obtaining of a single phase crystal structure is important because, for example, the constituent precursor materials or intermediate phases formed in processing may not be catalytically active or stable unless incorporated into the desired crystal structure and/or it is the most economical use of the materials.

2. Preparation of Perovskite Compounds

The first step in the preparation of the mixed metal oxide according to the present invention is to prepare a material of the desired composition — or which will form the desired composition during the heat treatment in an atmosphere oxidizing to the components — in the form of a mechanically alloyed powder.

A mechanically alloyed powder is one in which precursor components have been intimately intradispersed throughout each particle with the individual constituents being distributed substantially uniformly at close spacings within the particles. It is characterized by exceptional uniformity of the individual constituents in the product powder particles. The mechanically alloyed powder particles are distinguished from powders which are merely powder agglomerates, the agglomerates being essentially clusters or masses of loose powders of different compositions, and also from particles into which the precursor components are welded, i.e., the constituents are simply joined to one another without intimate intradispersion.

The fundamental mechanism of mechanical alloying is the simultaneous comminution and cold welding of the precursor component particles to form the product composite powder particles. A dynamic equilibrium is achieved between the competing processes of comminution and cold welding, resulting in very little net change in powder size distribution during the course of processing.

A way in which mechanical alloying can be achieved is by subjecting a mixture of precursor powders to dry high energy impact milling. This technique is different from conventional grinding or milling techniques in operation and in ultimate effect. The conventional grinding techniques tend to merely reduce the particle size, i.e., comminute the component precursor powders and for the most part the powders do not form composite powder particles of substantially uniform composition relative to each other. Thus, the ultimate particle size of the conventionally milled material must be very fine in order to obtain a homogeneous product. Heating alone — unless at very high temperatures for a long period of time, possibly several days at temperature — may still not be sufficient to achieve a homogeneous product. By high energy impact milling a mechanically alloyed powder product can be developed, which has a particle size of less than about 100 microns, e.g. an average particle size of about 1 to 20 microns, and as indicated above the product is characterized by substantially all the particles containing the metallic components of the desired $ABO_3$ compound, and such components are intradispersed and distributed substantially uniformly and at close spacings within the particles.

To develop the desired perovskite structure, the mechanically alloyed powder composition is subjected to a reaction treatment consisting of subjecting the composition to an elevated temperature in an oxidizing atmosphere. As indicated above, the time and temperature are interrelated. An advantage of the present process is that substantial conversion to an essentially single phase mixed metal oxide structure such as a perovskite can be achieved in a reasonably short period of time at a relatively low temperature. It has been found, for example, that in a single stage heat treatment a temperature of 800° C. is insufficient and 900° C. is sufficient for formation of the perovskite in one hour at temperature. The maximum temperature used in the tests is about 1200° C., and it has also been found satisfactory. Lower temperatures are preferred for reasons of economics and ease of use. Also, higher surface areas can be achieved at lower temperatures. Apart from all considerations, volatilization or other undesired effects would place a maximum limitation on temperature. Generally, heating can be carried out at temperatures, suitably about 900° C. to 1200° C., for a relatively short period of time, e.g., about one hour. In a preferred embodiment of the present invention, the heat treatment is carried out in two stages; first heating below about 800° C., preferably between about 300° C. and 700° C., e.g. about 600° C., for a period of less than about 5 hours and then elevating the temperature to above about 900° C., preferably between about 900° C. and 1200° C., e.g. about 1000° C. for about 1 to 100 minutes. It is believed that temperature control in the first stage is below that at which a spontaneous high reactivity occurs, but it is sufficiently high to effect diffusion and reactivity within a reasonably short period of time, e.g. a total of up to about 7 hours. As indicated above in order to obtain optimum conversion the bed depth of the powder is controlled during the heating stage.

Mechanical alloying by high energy impact milling can be achieved by the process described in, for example, U.S. Pat. Nos. 3,591,362 and 3,830,435 and U.K. Patent No. 1,429,085. In U.S. Pat. No. 3,830,435 and U.K. Patent No. 1,429,085 describe methods using the high energy milling technique for producing ceramic materials. U.S. Pat. No. 3,928,235 discloses that a high temperature catalyst can be prepared from an alloy such as copper and chromium in a composition range where there is a miscibility gap by a method using a mechanical alloying technique. In contrast with the present mixed oxide catalysts the catalytic material produced in U.S. Pat. No. 3,928,235 is essentially in the form of a metallic alloy.

Dry, high energy impact milling to develop a mechanically alloyed ceramic composition is described in the aforementioned U.S. Pat. No. 3,830,435. As indicated in this patent, the term "high energy milling" refers to the condition which is developed in the mill when sufficient mechanical energy is applied to the total charge such that a substantial portion of the attritive elements, e.g., ball elements, are continuously and kinetically maintained in a state of relative motion. For optimum results it has been found advantageous to maintain a portion of the attritive elements out of static content with each other; that is to say, maintained kinetically activated in random motion so that a substantial number of elements repeatedly collide with one another. It has been found advantageous that at least 40%, e.g., 50% or 70% or even 90% or more of the attritive elements should be maintained in a highly activated state.

High energy impact milling may be accomplished, for example, in high energy machines such as the Szegvari attritor, the highspeed laboratory shaker mill ("Spex" mill) or even in vibratory ball mills, but the ratio of impacting media to powder should be greater than about 3:1 (by weight) preferably being at about 10:1 or 20:1 and most advantageously, being at least about 10:1.

It is important that the milling be conducted dry and the use of solid or liquid separating agents, lubricants, detergents, etc. be avoided in the mill as otherwise the interdispersion bonding and the increase in internal interfacial surface which characterize the intensively dry milled powders is undesirably interfered with or is prevented. The increase in internal interfacial surface can be measured by a decrease in crystallite size measured by X-Ray line broadening. An increase of particle homogeneity can be seen by scanning electron microscopy and energy dispersive X-Ray spectroscopy. Powder particle superficial areas can be measured by the BET method. The increased rate and completeness of the perovskite forming reaction as determined by X-Ray diffraction is also a measure of the intradispersion of the reactants.

To prevent packing during high energy milling, the charge materials are processed in the presence of a low molecular weight hydrocarbon, i.e. a hydrocarbon in in vapor phase at the processing conditions. Examples of suitable hydrocarbons are methyl alcohol, ethyl alcohol, propyl alcohol, isopropyl alcohol, acetone, benzene and the like. Methyl alcohol and isopropyl alcohol are examples of preferred additives to the atmospheres. Conveniently, the additive is charged to the attritor by bubbling an air feed through the additive, e.g. methyl alcohol, so as to provide the additive in the atmosphere continuously.

By maintaining the attritive elements in a highly activated state of mutual collision in a substantially dry environment and throughout substantially the whole mass, optimum conditions are provided for producing a mechanically alloyed structure within substantially each particle. As intensive dry milling proceeds the internal homogeneity of the product powder improves up to an optimum milling time which, as will be appreciated by the artisan, is deemed to be a function of the powder system being milled and the equipment. Continued milling does not appear to further improve homogeneity of the product powder. Homogeneity can be determined by the scanning electron microscope and similar techniques. In some cases, intensive dry milling provides homogeneity in the product on a scale approaching the molecular, a point exceeding the capability of presently available measuring devices.

During the course of the high energy milling, in addition to the interdispersion of the precursor materials and mechanical bonding of the interdispersed constituents taking place, it is possible that chemical reaction of some of the precursor materials may occur.

As indicated above, high energy impact milling techniques have been used to produce ceramic materials. In general, as shown in U.S. Pat. No. 3,830,435, U.K. Pat. No. 1,429,085, the ultimate objective has been to produce consolidated materials having certain properties. Unlike previous processes which use high energy impact milling, the present invention utilizes the technique to prepare catalysts in the form of powders, the composition of said powders being essentially single phase mixed metal oxides. Moreover, a powder can be produced which has a surface area higher than would be produced by conventional grinding techniques.

High surface areas can be achieved in accordance with the present invention by regulating the time and ball-to-powder ratio in the high energy mill and subsequently the times and temperatures in the heat treatment steps.

In general, the ball-to-powder ratio in the high energy milling step is about 5 to 1 to about 20 to 1, e.g. about 10 to 1, for a period of time sufficient to provide a product which will on heat treatment be converted to an essentially single phase material. Processing time is related to the size of the attritor, but in general milling time is less than 40 hours, e.g. from about 5 to 20 hours. For example, in a Spex mill processing can be achieved in about ½ to 2 hours, e.g. about 1 hour. However, in a ½ S attritor (i.e. an attritor containing approx. ½ gallon of attriting elements, e.g. balls), which can handle samples of about 400 to 1500 grams, processing time will be greater than about 10 hours up to about 40 hours, e.g. about 20 hours. In a larger attritor, e.g. a 1 S attritor, which can handle samples of about 800 to 3000 grams, or even larger attritors, processing time is about 5 hours to about 40 hours, e.g. about 10 to 30 hours.

The resultant high energy impact milled material is in the form of a mechanical alloy which can be developed into a suitable catalytic material by a one-stage or two-stage heat treatment, as set forth in detail above.

As indicated above, the perovskite-structured compound can be used in any form desired. For example, it can be used in the particulate form, e.g., as a powder, or formed into pellet or sphere. It can be deposited on a particulate support or a preformed substrate. The substrate may be, e.g., a metal or a ceramic. Techniques for forming typical catalytic structures can be found, for example, in U.S. Pat. No. 3,897,367.

The heat treatment required to convert the mechanically alloyed powder into the perovskite structure may be applied before the powder is applied to a support, during deposit on a support, or during use in a catalytic process, provided that the temperature is sufficient to provide complete reaction and the conditions are not such that an important constituent is lost, such as by volatilization, or the perovskite structure is destroyed.

To illustrate the invention and to give those skilled in the art a better understanding of the invention several examples are given below. In the examples, the following general procedures are used to obtain the platinum-group metal-containing perovskite-structured materials.

(1) To form the perovskites the starting materials are used in elemental form, master alloys, oxides, salts or other suitable compounds. In general, the charge materials may be selected on a basis of availability and cost, provided that the form is suitable (i.e. a fine powder) and unwanted additives are not introduced into the product. For example, strontium has been introduced as SrO, lanthanum as $La_2O_3$, cobalt as Co and CoO, nickel, manganese, chromium, copper, and titanium in elemental form, and platinum group metals in elemental form, as chlorides, hydrated chlorides, ammonium chlorides or oxides; e.g., Ru, $PdCl_2$, $RuCl_3xH_2O$, $(NH_4)PtCl_6$, $RuO_2$. In larger sizes high energy milling it is preferred to use the platinum-group metal in elemental form or as oxides. Compounds such as hydroxides, carbonates, nitrates, oxalates, chlorates, can also be used. All are introduced in fine powder form, e.g., having a particle size of about 0.1 to 10 microns.

(2) To mechanically alloy the starting materials, they are charged to a high energy mill and subjected to dry high energy milling using hardened 52100 steel balls. The charge weight consists of the proper weights and proportions of starting materials to give reacted weight based on 10 to 1, ball-to-powder weight ratio. In general, mechanical alloying of the starting materials is achieved in about 5 to 20 hours. Under conditions which cause particles to be packed at the bottom of the milling container, an atmosphere containing a low molecular weight hydrocarbon — in vapor phase during processing — is maintained in the milling container. Examples of the low molecular weight hydrocarbons are methyl, ethyl and propyl alcohols, acetone and benzene.

(3) The heat treatment applied to the mechanically alloyed powders consists of a heat treatment in air at the indicated temperatures for indicated periods of time.

(4) The heat-treated product obtained consists of submicron sized perovskite crystals agglomerated loosely into particles typically 10 to 100 microns in size. This morphology is advantageous for ease of handling and high surface area. It may be used as is or sintered into pellets of any desirable size by, for instance, blending with a binder-lubricant such as "Accrawax C", a product sold by Clyco Chemicals Inc., pressing and sintering at 1200° C. for one hour. Alternatively, it can be dispersed on a support such as alumina, for instance, by blending with "Dispal", an alpha-alumina monohydrate manufactured by Continental Oil Co., acid and water. The mix can be slurry coated on a honeycomb support or extruded to pellet form. After calcining, a high surface area product with a fine uniform dispersion of the catalyst is obtained.

EXAMPLE I

This example shows that the high energy milling processing treatment of this invention followed by a relatively short reaction treatment produces the desired perovskite-structured oxides.

(A) Strontium oxide, lanthanum oxide, metallic cobalt and ruthenium trichloride were weighed in the correct amounts and proportions to yield 10 grams of the perovskite-structured composition $(Sr_{0.2}La_{0.8})(Co_{0.8}Ru_{0.2})O_3$. The blended powders are high energy milled in a Spex mill with 100 grams of hardened 52100 grade steel balls for one hour in ambient air. The milled product is reaction heat treated in air for 2 hours at 1200° C. The heat treated material was subjected to X-Ray diffraction analysis and found to have a perovskite structure similar to file number 9-358 of the Powder Diffraction File of the Joint Committee on Powder Diffraction Standards.

(B) Following essentially the same procedure as that shown in Part A of this Example, except that the components were varied to produce end products of the compositions indicated in Table I.

X-Ray diffraction analyses of the above compositions following the reaction heat treatment showed that in all samples a substantially single phase perovskite was formed.

EXAMPLE II

This example shows catalytic characteristics of a perovskite powder prepared in accordance with the present invention for purifying a gas composition prepared to simulate exhaust compositions from engine operation at various air to fuel ratios (AFR).

The gas compositions chosen are based on published values slightly modified to conform to values determined to fix stoichiometric balance at about 14.6 AFR. The constituents of the gas stream are CO, $O_2$, $H_2$, NO, hydrocarbons, $CO_2$, $H_2$, $N_2$, and $H_2O$. In the experiment, gas compositions fed to a catalytic reactor are preheated over pieces of SiC and quartz wool.

Figure 1:
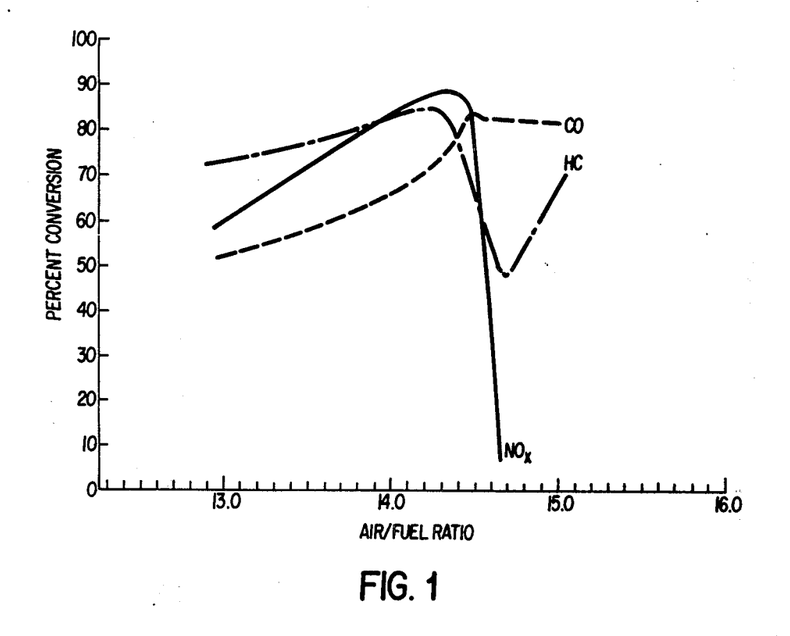
FIG. 1 shows the percent conversion of $NO_x$ (oxides of nitrogen), CO and hydrocarbon at 482° C. as a function of the air/fuel ratio (AFR), using a catalyst prepared according to EXAMPLE I Part A and a test as described in EXAMPLE II.
Figure 2:
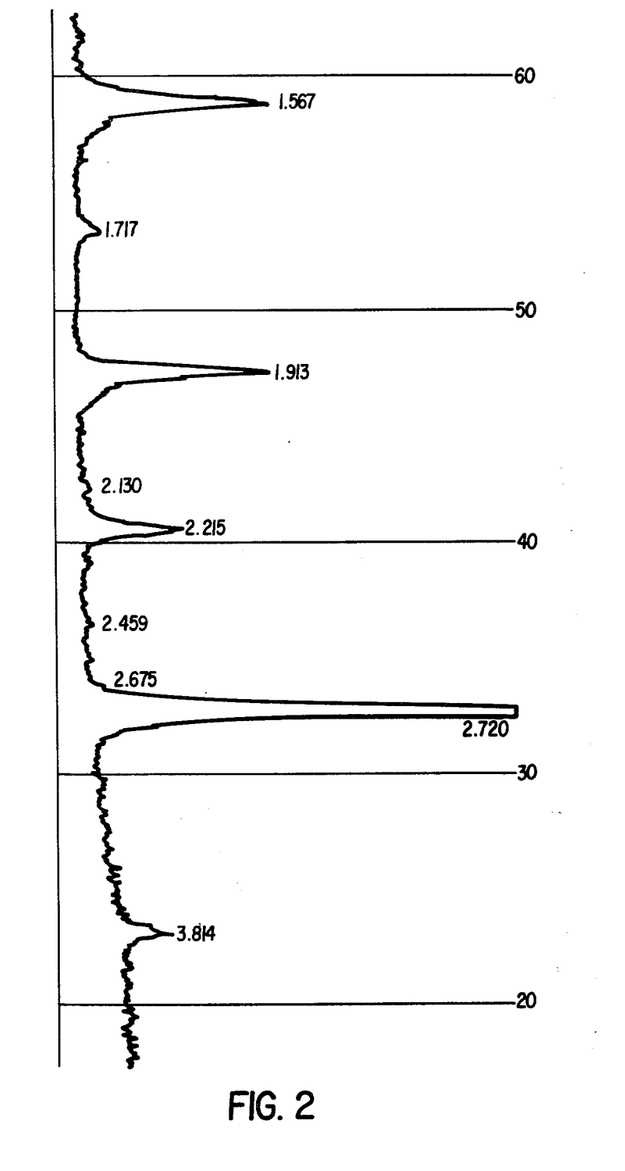
FIG. 2 is an X-Ray diffraction pattern, shown on a scale of 20° to 60° diffraction angle, of a perovskite powder prepared in accordance with the present invention. It shows the resultant powder formed on heat treatment of a mechanically-alloyed material to be an essentially single phase perovskite oxide of strontium, lanthanum, cobalt and ruthenium, with only a trace of cobalt oxide appearing in the analysis.

A ruthenium-containing perovskite powder having the composition and preparation described in Example I part A is used as the catalyst, dispersed on an alumina support by blending the Dispal, extruding and firing the resultant material in air. The inlet and outlet gas compositions are monitored and the conversions of CO, hydrocarbons and nitrogen oxides at 482° C. (900° F.) and at a space velocity of 80,000 $hr^{-1}$ as a function of the AFR (air/fuel ratio) are shown in FIG. 1.

The results shown in the figure demonstrate greater than 80% $NO_x$ conversion over a AFR ratio of about 13.9 to 14.5.

X-Ray diffraction analysis of the catalyst material following testing indicated that no structural changes had occurred as a consequence of testing. This demonstrates the stability of the perovskite catalyst under the given test conditions.

EXAMPLE III

This example shows the effect of deletion of high energy milling from the preparation.

Strontium oxide, lanthanum oxide, metallic cobalt and ruthenium trichloride, are weighed in the amounts and proportions to yield 10 grams of the perovskite structured composition $(Sr_{0.2}La_{0.8})(Co_{0.9}Ru_{0.1})O_3$ and blended by hand, by shaking in a vial. The blended powders are heat treated for 2 hours in air at 1200° C. The resultant heat treated material was subjected to X-Ray diffraction analysis and found to consist of a blend of an orthorhombic structured perovskite, a cubic perovskite and cobalt oxide. It will be noted that two perovskites were made and they had different structures and therefore were of different compositions, and that the cobalt was incompletely incorporated in the perovskites. Thus, a specific single phase composition was not made by the technique of blending and heat treating. Example I, prepared in accordance with the present invention, showed total transformation of material to a single perovskite phase on heating the high energy milled material in air for 1 hour at 1200° C. A comparison of surface areas of a sample prepared by merely blending and heat treating with samples milled for 5 minutes to 4 hours in a Spex Mill shows that high surface areas were obtained in the samples that were prepared by high energy impact milling. All samples were heat treated for 2 hours at 1200° C. in air. Conversion was not complete in samples milled for less than 15 minutes in the Spex Mill. However, while surface areas varied from about 0.76 to 2.1 $m^2/g$ in the milled material, the surface area for the unmilled sample was only 0.46 $m^2/g$.

This test demonstrates that the intimate intradispersion of the ingredients provided by high energy milling can convert the components to the desired compositions whereas simply blending and heat treating the ingredients did not and that materials of higher surface can be obtained by the process of the present invention.

EXAMPLE IV

This example shows the effect of the heat treatment temperature on composition.

Samples of high energy milled powder of the intended composition $(Sr_{0.2}La_{0.8})(Co_{0.9}Ru_{0.1})O_3$ prepared as indicated in part A of Example I are heat treated at various temperatures in the range of 400° C. to 1200° C. for one hour in air. The resultant samples are subjected to X-Ray diffraction analysis. Results are given in TABLE II.

TABLE II

| Heat Treatment Temperature | X-Ray Diffraction Results |
| --- | --- |
| No heat treatment | La(OH), Co (hexagonal), Co (FCC)* - no perovskite phase |
| 400 | Complex oxide - no perovskite phase |
| 600 | Complex oxide - no perovskite phase |

TABLE II-continued

| Heat Treatment Temperature | X-Ray Diffraction Results |
| --- | --- |
| 800 | Complex oxide - plus minor perovskite phases |
| 1000 | Good Conversion to single perovskite phase, minor CoO |
| 1200 | Total Conversion to single perovskite phase |

*FCC = face centered cubic

The results indicate that a reaction heat treatment temperature of over 800° C. is required to form the desired perovskite-structured compound in 1 hour. Essentially total conversion was achieved at 1000° C. in 1 hour. It is believed to be especially important to obtain total incorporation of a ruthenium component within the perovskite structure; otherwise, in use any unconverted ruthenium could be converted to $RuO_4$ and volatilized. In the tests, conversion to the perovskite at temperature is carried out initially, i.e., before the powder is developed into the desired catalyst structure e.g. on a substrate. It is also believed to be possible to convert the mechanically-alloyed material to the perovskite structure during the formation of the catalyst structure, or as an activation step prior to use in a process, or in use in the catalytic reaction.

EXAMPLE V

This example illustrates the effect of high energy milling time on surface area of the product.

Samples are prepared by charging to a 1 S Attritor a mixture of the powders SrO, $La_2O_3$ (freshly prepared from calcining lanthanum oxalate), Co, and Ru (Co and Ru powders having a particle size of the order of about 4 microns) in a proportion to give the composition $(Sr_{0.4}La_{0.6})(Co_{0.9}Ru_{0.1})O_3$. The blended powders are high energy milled at a ball-to-powder ration (B/P) of 10:1 at 270 rpm. To prevent packing in the attritor methyl alcohol at 1 ml. per 100 grams of charge is added initially to the heat, and air fed to the charge during milling is bubbled first through 5% methyl alcohol. After periods of 5, 10, 20, 30 and 40 hours, 25 gram samples are drained and heat treated in air for 1 hour at 600° C. and then 10 minutes at 1000° C. Milling time, surface area (SA) of the product determined after heat treatment by BET analysis and crystal structure by X-Ray diffraction are tabulated in TABLE III.

TABLE III

| Milling Time (Hrs.) | BET SA ($m^2/g$) | X-Ray Diffraction Results |
| --- | --- | --- |
| 5 | 3.5 | Very strong, orthorhombic perovskite + weak CoO |
| 10 | 4.6 | Very strong orthorhombic perovskite + very weak CoO |
| 20 | 5.2 | Approx. same as 10 hrs. |
| 30 | 4.5 | Very strong orthorhombic perovskite + very very weak CoO. |
| 40 | 5.4 | Same as 30 hrs. |

A plateau appears to be reached at about 20 hours. The indication of CoO as very weak means that essentially only trace amounts of CoO appeared in the analysis and it was estimated that in the 5, 10 and 20 hour samples CoO was present in an amount less than about 5%.

The surface area obtained for all these samples compared very favorably with reported surface areas of perovskites prepared by conventional grinding techniques, which are shown in the Voorhoeve et al. 1977 article in Science to be less than the 3.5 $m^2/g$ shown above in Table III for the poorest material milled for only 5 hours in the 1 S attritor.

EXAMPLE VI

This example illustrates the multi-stage reaction treatment in accordance with a preferred embodiment of the present invention.

The following raw materials in amounts to produce a perovskite oxide of the composition $(Sr_{0.4}La_{0.6})(Co_{0.9}Ru_{0.1})O_3$ are charged to ½ S attritor:

| Samples A & B: | Strontium as SrO powder Lanthanum as $La_2O_3$ powder (freshly calcined from lanthanum oxalate) Ruthenium as $RuO_2$ powder |
| --- | --- |
| Samples C & D: | Same as Samples A & B except that Ru used as metal powder |

The samples are subjected to high energy impact milling in the ½ S attritor under the following conditions:
Ball composition: AISI 52100 steel
Ball diameter: ⅜ inch
Ball charge weight: 7 kilograms
Ball/Powder Ratio: 10/1 (based on reacted weight of perovskite powder)
Milling Time: 20 hours
Atmosphere: 5 ml. methyl alcohol initially, then fed by means of bubbling air flow first through alcohol then to attritor during processing.

The effects of temperature and time are shown in Table IV, and the efects of powder bed geometry with heat treatment are shown in Table V. In the tables, "vs" means very strong, "s" means strong, "w" means weak, "vw" means very weak, "unid." phases means unidentified phases, "perov" means perovskite, and "NA" means not analyzed.

TABLE IV

| Sample | Heat** Treatment | BET Surface Area | X-Ray Diffraction Results |
| --- | --- | --- | --- |
| A-1 | 1000° C/10 min. | NA | S orthorhombic perov, w perov,* w CoO. |
| A-2 | 1000° C/1 hr. | 2.1 $m^2/g$ | vs orthorhomibic perov, w CoO. |
| A-3 | 1000° C/5 hrs. | 1.7 | vs orthorhombic perov, w CoO. |
| A-4 | 1200° C/1 hr. | 0.14 | vs orthorhombic perov, vw CoO. |
| A-5 | 800° C/10 min. | NA | s orthorhombic perov, w perov,* unid. phases. |
| A-6 | 900° C/10 min. | NA | s orthorhombic perov, w perov,* w CoO. |
| A-7 | 600° C/1 hr. + 1000° C/10 min. | 9.1 | vs orthorhombic perov, w CoO. |
| A-8 | 300° C/1 hr. + 1000° C/10 min. | NA | Same as A-7 |
| B-1 | 1000° C/1 hr. | 1.5 | vs orthorhombic perov |
| C-1 | 1000° C/1 hr. | NA | vs orthorhombic perov, w CoO. |
| C-2 | 600° C/1 hr + 1000° C/10 min. | NA | vs orthorhombic perov, vw CoO. |
| D-1 | 400° C/1 hr. + 1000° C/10 min. | NA | vs orthorhombic perov, w CoO, vw $RuO_2$. |
| D-2 | 500° C/1 hr. + 1000° C/10 min. | NA | vs orthorhombic perov, vs CoO. |
| D-3 | 700° C/1 hr. + 1000° C/10 min. | NA | vs orthorhombic perov, w CoO. |
| D-4 | 800° C/1 hr. + 1000° C/10 min. | NA | vs orthorhombic perov, w CoO, |

TABLE IV-continued

| Sample | Heat** Treatment | BET Surface Area | X-Ray Diffraction Results |
|---|---|---|---|
| | | | vw RuO$_2$. |

*An intermediate perovskite, other than the desired orthorhombic phase.
**Conditions: 1. All heat treating done in small ceramic boat using approximately 5 grams powder. 2. All heat treatments done in air.

TABLE V

The effects of Powder bed Geometry during heat treatment is shown in TABLE V.

| Sample | Powder Bed Geometry | Heat Treatment* | BET Surface Area | X-Ray Diffraction Results |
|---|---|---|---|---|
| A-9 | 1 inch deep | 1000° C/1 hr. | 0.67 m$^2$/g | s orthorhombic perov, w CoO, unid. phases |
| A-2 | very shallow | " | 2.1 | vs orthorhombic perov, w CoO |
| C-2 | " | 600° C/1 hr. + 1000° C/10 min. | NA | vs orthorhombic perov, wv CoO. |
| C-3 | 1/2 inch deep | " | NA | vs orthorhombic perov. |
| C-4 | 1 inch deep | 600° C/1 hr. + 1000° C/10 min. | NA | s orthorhombic perov, w perov,** w RuO$_2$, w CoO. |
| D-5 | " | 400° C/1 hr. + 1000° C/10 min. | NA | s orthorhombic perov, w RuO$_2$, w CoO, w Co, unid. phases |
| D-6 | " | 500° C/1 hr. + 1000° C/10 min. | NA | s orthorhombic perov, w RuO$_2$, w CoO, unid. phases. |
| D-7 | " | 700° C/1 hr. + 1000° C/10 min. | NA | vs orthorhombic perov, w CoO |
| D-8 | " | 800° C/1 hr. + 1000° C/10 min. | NA | vs orthorhombic perov, w CoO, vw RuO$_2$ |

*All heat treatments done in air
**An intermediate perovskite other than the desired orthorhombic phase

EXAMPLE VII

This example illustrates the preparation of mixed metal oxides of a spinel structure and a rutile structure. It also shows that materials of a spinel struuucture, prepared in accordance with the present invention, exhibited catalytic activity.

Cobalt, titanium and ruthenium dioxide powders were weighed in the correct amounts and proportions to yield 10 grams of the spinel-structured composition Co$_2$Ti$_{.9}$Ru$_{.1}$O$_4$. The blended powders were high energy milled in a Spex Mill with 100 grams of hardened AISI 52100 grade steel balls for one hour in sealed air. The milled product was reaction heat treated for 1 hour in air at 1000° C. The heat treated powder was subjected to X-Ray diffraction analysis and found to consist of a single phase having the spinel structure.

Another spinel of composition Ni$_1$Mn$_{1.9}$Ru$_{.1}$O$_4$ was prepared in exactly the same way using NiO, Mn and RuO$_2$ powders.

Both spinel-structured oxides were mounted on Dispal and tested as described in Example II and both exhibited catalytic activity for the conversion of CO, NO$_x$ and hydrocarbons.

A rutile structured phase of composition Cr$_{.9}$Ru$_{.1}$Ta$_1$O$_4$, was made in exactly the same way using Cr, Ta and RuO$_2$ powders.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

What is claimed is:

1. In a process for synthesizing a mixed metal oxide catalyst material comprising at least one platinum group metal and having a predetermined composition and a predetermined crystal structure by a method comprising grinding and heating a mixture of powders to obtain a product of predetermined composition, the improvement which comprises subjecting a mixture of powders selected from at least one of the group consisting of elemental metals, alloys and compounds which on processing will convert to the desired mixed metal oxide, said mixture of powders being formulated to contain, or on heat treatment in an oxidizing atmosphere to contain, a stoichiometric ratio of the constituents of the predetermined mixed metal oxide composition to dry, high energy impact milling for a period of time sufficient to produce a mechanically-alloyed powder which will convert on heat treatment to an essentially single phase structure of the predetermined composition and crystal structure, and heating said mechanically-alloyed powder in an oxidizing atmosphere to effect conversion to said mixed metal oxide catalyst material.

2. The process of claim 1, wherein the mixed metal oxide catalyst material is of a structural type selected from the group consisting of perovskite, spinel, pyrochlore, ilmenite, rutile, and rock salt.

3. The process of claim 1, wherein the mixed metal oxide is a perovskite of the ABO$_3$ type.

4. In a process of synthesizing a mixed metal oxide catalyst material having a predetermined crystal structure by a method comprising grinding and heating a mixture of powders to obtain a product of predetermined composition, the improvement which comprises subjecting a mixture of powders selected from at least one of the group consisting of elemental metals, alloys and compounds which on processing will convert to the desired mixed metal oxide, said mixture of powders being formulated to contain, or on heat treatment in an oxidizing atmosphere to contain, a stoichiometric ratio of the constituents of the predetermined mixed metal oxide composition, to high energy impact milling for a period of time sufficient to produce a mechanically-alloyed powder which will convert on heat treatment to an essentially single phase structure of the predetermined composition and crystal structure, and heating the mechanically-alloyed product obtained by dry, high energy impact milling in an oxidizing atmosphere to a temperature below about 800° C. for a period of time of up to about 5 hours and then raising the temperature to above about 900° C. for a period of about 1 to about 100 minutes to effect conversion to said mixed metal oxide catalyst material.

5. In a process for synthesizing a mixed metal oxide catalyst material, said mixed metal oxide having a predetermined composition of the empirical formula ABO$_3$ and a perovskite-type structure, as shown by X-ray diffraction, by a method comprising grinding and heating a mixture of powders to obtain a product of the predetermined composition, the improvement which comprises subjecting a mixture of powders selected from at least one of the group consisting of elemental metals, alloys and compounds which on processing will convert to the desired mixed metal oxide, said mixture of powders being formulated to contain, or on heat treatment in an oxidizing atmosphere to contain, a stoichiometric ratio of the predetermined $ABO_3$ composition, to dry, high energy impact milling to produce a mechanically-alloyed powder product which will convert on heat treatment to an essentially single phase perovskite structure of the predetermined composition, and heating said mechanically-alloyed product in an oxidizing atmosphere to effect conversion to said perovskite structure of predetermined composition.

6. The process of claim 5, wherein in the empirical formula $ABO_3$, A represents at least one element selected from the group consisting of alkali metals, alkaline earth metals, rare earth metals, lead and bismuth, and B represents at least one element selected from groups IB, IVB, VB, VIB, VIIB, and VIII of the Periodic Table.

7. The process of claim 5, wherein said component B comprises at least one element selected from the group consisting of nickel, cobalt, platinum, palladium, ruthenium, rhodium, iridium and osmium.

8. The process of claim 6, wherein said component B comprises at least one platinum group metal.

9. The process of claim 8, wherein said platinum group metal is ruthenium.

10. The process of claim 5, where the components of the powder formulation subjected to high energy impact milling are selected from at least one of the group consisting of elemental metals, oxides, carbonates, halides, hydroxides, nitrates, oxalates of the components A and B of the empirical formula $ABO_3$.

11. The process of claim 5, wherein the heat treatment comprises heating the mechanically alloyed powder obtained by high energy impact milling to a final temperature greater than 800° C.

12. The process of claim 11, wherein the final temperature is in the range between about 900° C. and 1200° C.

13. The process of claim 11, wherein the heat treatment comprises subjecting said mechanically alloyed powder in oxidizing atmosphere to a temperature below about 800° C. for a period of up to about 5 hours and then elevating the temperature to above 900° C. for a period of about 1 to about 100 minutes.

14. The process of claim 13 wherein the mechanically alloyed powder is subjected to a temperature of about 300° C. to 700° C. for a period of ¼ to 4 hours and then to a temperature of about 900° C. to 1200° C. for a period of 1 to 100 minutes.

15. The process of claim 11, wherein the final heat treatment temperature of the powder is carried out with the powder maintained at a bed depth equivalent to no greater than 1 inch.

16. The process of claim 5, wherein the high energy impact milling is carried out at a ball-to-powder ratio of about 5 to 1 to about 20 to 1 for a period of up to about 40 hours.

17. The process of claim 16, wherein the said high energy impact milling is carried out for a period of about 10 to 30 hours.

18. The process of claim 5, wherein the powder produced by said high energy impact milling has an average particle size of about 1 to 20 microns and after heat treatment the product powder obtained consists essentially of agglomerates of crystals, the average particle size of said agglomerates being typically about 10 to 100 microns.

19. The process of claim 5, wherein the final treatment temperature is less than about 1200° C.

20. The process of claim 5, wherein the heat treatment is carried out at a temperature of less than about 1200° C., and a single phase product is obtained in a period of time of up about 7 hours.

21. The process of claim 5, wherein the A component consists essentially of the elements strontium and lanthanum and the B component is at least one element selected from the group consisting of cobalt, manganese, nickel, chromium, titanium, ruthenium, palladium, platinum and rhodium.

22. The process of claim 4, wherein the mixed metal oxide catalyst material is of a structural type selected from the group consisting of perovskite, spinel, pyrochlore, ilmenite, rutile, and rock salt.

23. The process of claim 4, wherein the mixed metal oxide material is further treated by a deposit of a platinum group metal.

* * * * *